DAVID D. SCHAMP.

Improvement in Grain-Screens.

No. 126,493. Patented May 7, 1872.

Witnesses:
A Bennerkendorf.
Geo. W. Mabee

Inventor:
D. D. Schamp
PER
Attorneys.

No. 126,493

UNITED STATES PATENT OFFICE.

DAVID D. SCHAMP, OF PLEASANT RUN, NEW JERSEY.

IMPROVEMENT IN GRAIN-SCREENS.

Specification forming part of Letters Patent No. 126,493, dated May 7, 1872.

Specification describing a new and useful Improvement in Combined Screen and Delivery-Spout, invented by DAVID D. SCHAMP, of Pleasant Run, in the county of Hunterdon and State of New Jersey.

Figure 1:
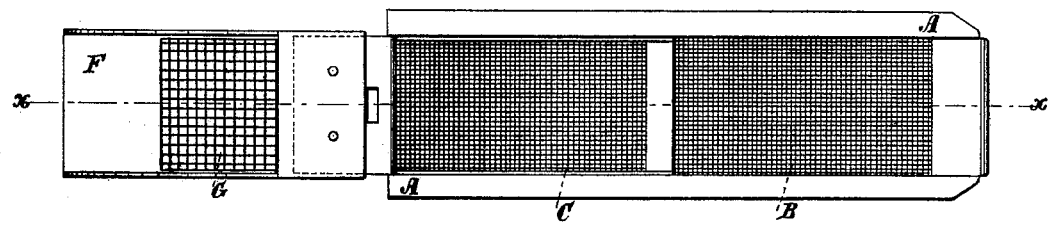
Figure 2:
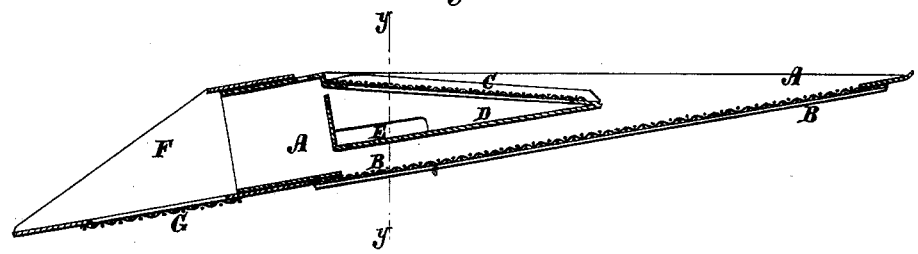
Figure 3:
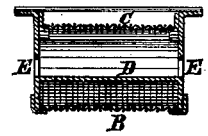

Figure 1 is a top view of my improved screen and spout. Fig. 2 is a detail longitudinal section of the same taken through the line $x$ $x$, Fig. 1. Fig. 3 is a detail cross-section of the same taken through the line $y$ $y$, Fig. 2.

Similar letters of reference indicate corresponding parts.

My invention has for its object to improve the construction of the delivery-spouts of thrashers and grain-separators, so as to more thoroughly clean the grain before it is delivered into the receiving-box or half-bushel, and which shall be simple in construction and convenient in use; and it consists in the construction and combination of the various parts, as hereinafter more fully described.

A is the spout, which is made with flanges along the upper edges of its sides to adapt it to be slipped into a groove formed for it in the shoe of the machine, so that it may be shaken by and with the shoe. The bottom of the spout A is made of wire-cloth or perforated sheet metal, to form a screen, B, through which the dust and fine seeds may escape, while the grain passes down said screen and escapes from the outer end of the spout A.

If the spout A were left open, as hereinbefore described, the part of the grain that fell upon it near its lower end would scarcely be screened at all. To remedy this I place a plate, C, in the upper part of the spout A, near its lower end, to receive the grain and guide it to the upper part of the screen B, so that it may pass over a longer portion of the screen B. The plate C may be a plane plate, or a wire-cloth or perforated sheet-metal plate, to remove the dust and fine seeds, which are received upon the plate D, placed between the screens B and C, and attached to the sides of the spout A, and from which it escapes through holes E in the sides of the spout A. The outer end F of the spout A is extended fourteen inches, more or less, and has a screen, G, formed in or attached to the inner part of its bottom, of such a coarseness as to allow the grain to pass through, while the straws, heads, &c., which may be in the grain will slide over the screen G and will drop from the outer end of the spout F.

The spout F may be formed upon the outer end of the spout A, or it may be made detachable, so that it may be detached when desired. The latter construction I prefer, as it enables the spout F to be detached when not required for use.

Having thus described my invention, I claim as new and desire to secure by Letters Patent—

1. The combination of the screen C and plate D, openings E, with the spout A, having a screen, B, in its bottom, substantially as herein shown and described, and for the purpose set forth.

2. The combination of the spout F and screen G, whether detachable or permanent, with the spout A, screen B, screen C, plate D, and openings E, substantially as herein shown and described, and for the purpose set forth.

DAVID D. SCHAMP.

Witnesses:
SILVESTER LOWE,
GEORGE W. COOK.